3,375,291
PROCESS FOR PREPARING DIOLEFINS
James L. Callahan, Bedford, and Ernest C. Milberger, Maple Heights, Ohio, assignors to Standard Oil Company, Cleveland, Ohio, a corporation of Ohio
No Drawing. Continuation-in-part of application Ser. No. 240,734, Nov. 28, 1962. This application Mar. 31, 1964, Ser. No. 356,028
11 Claims. (Cl. 260—680)

ABSTRACT OF THE DISCLOSURE

The catalytic oxidative dehydrogenation of monoolefins is conducted in a vertical reactor by passing oxygen and the monoolefin upwards through successive zones containing fluidized catalyst. The catalyst is regenerated by introducing the oxygen to a zone below the zone to which the monoolefin is fed.

---

The olefins useful as starting materials in the present invention include the open chain and cyclic monoolefins. The olefins useful as starting material in the present process must have at least four and up to about eight non-quaternary carbon atoms, of which at least four are arranged in a series in a straight chain or ring. This definition excludes such compounds as propylene and isobutylene. The olefins are preferably either normal straight chain or tertiary olefins. Both cis and trans isomers, where they exist, can be dehydrogenated in the present process.

Among the many olefinic compounds which can be dehydrogenated in the instant process are butene-1, butene-2, pentene-1, pentene-2, isoamylenes, 2-methyl-pentene-1, 3-methyl-pentene-1, 2-methyl-butene-2, hexene-1, hexene-2, 4-methyl-pentene-1, 3,4-dimethyl-pentene-1, 4-methyl-pentene-2, heptene-1, octene-1, cyclopentene, cyclohexane, 3-methyl cyclohexene, and cycloheptene.

Open chain olefins yield diolefins, and, in general, six-membered ring olefins yield aromatic ring compounds. The higher molecular weight open-chain olefins may cyclize to aromatic ring compounds.

The feedstock, in addition to the olefin and oxygen, can contain one or more paraffinic or naphthenic hydrocarbons having up to about ten carbon atoms, which may be present as impurities in some petroleum hydrocarbon stocks and which also may be dehydrogenated in some cases. Propylene and isobutylene should not be included in substantial amounts.

The amount of oxygen used in the present process should be within the range of from about 0.3 to about 3 moles per mole of olefin. Stoichiometrically, 0.5 to 1.5 moles of oxygen per mole of olefin is required for the dehydrogenation to diolefins and aromatic hydrocarbons, respectively. It is preferred to employ an excess, from about 1 to about 2 moles per mole of olefin, in order to ensure a higher yield of diolefin per pass. The oxygen can be supplied as pure or substantially pure oxygen or as air or in the form of hydrogen peroxide.

When pure oxygen is used, it may be desirable to incorporate a diluent in the mixture, such as steam, carbon dioxide, or nitrogen.

The feed stock is preferably catalytically dehydrogenated in the presence of steam, but this is not essential. Usually, from about 0.1 to 6 moles of water per mole of olefin reactant is employed, but amounts larger than this can be used.

The dehydrogenation proceeds at temperatures within the range of from about 325° C. to about 1000° C. Optimum yields are obtainable at temperatures within the range from about 400 to 550° C. However, since the reaction is exothermic, temperatures in excess of 550° C. should not be used, unless means are provided to carry off the heat liberated in the course of the reaction. Due to the exothermic nature of the reaction, the temperature of the gaseous reaction mixture will be higher than the temperature of the feed entering the system by as much as 75° C. The temperatures referred to are those of the entering gas feed near the reactor inlet.

The preferred reaction pressure is approximately atmospheric, within the range of from about 5 to about 75 p.s.i.g. High pressures up to about 300 p.s.i.g. can be used and have the advantage of simplifying the product recovery.

Only a brief contact time with the catalyst is required for effective dehydrogenation. The apparent contact time with the catalyst can range from about 0.5 to about 50 seconds but higher contact times can be used, if desired. The apparent contact time may be defined as the length of time in seconds which the unit volume of gas measured under reaction conditions is in contact with the apparent unit volume of the catalyst. It may be calculated, for instance, from the apparent volume of the catalyst bed, the average temperature and pressure of the reactor, and the flow rates of the several components of the reaction mixture. At these contact times, comparatively small reactors and small amounts of catalyst can be used effectively.

The catalyst may be any catalyst useful for the conversion of monoolefinic hydrocarbons to diolefins and aromatic hydrocarbons, such as the antimony-uranium oxide catalysts disclosed in the copending U.S. patent application of James L. Callahan, Berthold Gertisser and Robert Grasselli, Ser. No. 201,279, filed on June 11, 1962, now U.S. Patent No. 3,251,899. Other useful catalysts include the combined oxides of antimony and cerium, antimony and manganese, antimony and tin, antimony and tungsten, antimony and molybdeum, antimony and titanium; bismuth molybdate, bismuth phosphate, bismuth tungstate, iron oxide plus a small amount of chromium and aluminum salts, iodine and iodide salts, sodium and lithium molybdates and phosphomolybdates, bismuth oxide plus oxides of molybdenum, tungsten and phosphorous, gold and platinum group metals, indium phosphates, tungstates or molybdates; non-volatile acids, such as phosphoric, phosphomolybdic, phosphotungstic, phosphoboric or their mixtures on activated alumina; the tungstates and molybdates of cobalt, vanadium, tungsten, or titanium and others of the types disclosed in the copending U.S. patent applications of James L. Callahan, Berthold Gertisser and Robert Grasselli, Ser. Nos. 201,330, filed June 11, 1962, now U.S. Patent No. 3,260,768, and 230,694 and 230,742 filed Oct. 15, 1962, now U.S. Patents Nos. 3,257,474 and 3,251,900, respectively. Similarly, catalysts embodied in the present process are disclosed in U.S. Patents Nos. 2,991,320, 2,991,321, 2,991,322, 3,028,440, and 3,050,572, British Patent No. 902,952, Belgian Patents Nos. 598,594, 602,709, 603,068, 609,050, 611,378, 611,379, 612,094 and South African Patent No. 62/597.

The catalyst can be employed without a support and will display excellent activity. It also can be combined with a support, and preferably at least 10% up to about 90% of the supporting compound by weight of the entire composition is employed in this event. Any known support materials can be used, such as, for example, silica, alumina, zirconia, alundum, silicon carbide, alumina-silica, and the inorganic phosphates, silicates, aluminates, borates and carbonates stable under the reaction conditions to be encountered in the use of the catalyst.

The catalyst may be prepared by any of the numerous methods of catalyst preparation which are known to those skilled in the art. For instance, the catalyst may be manufactured by co-gelling the various ingredients. The co-gelled mass may be dried in accordance with conventional techniques. The catalyst may be spray-dried, extruded as pellets or formed into spheres in oil, as is well-known in the art. Alternatively, the catalyst components may be mixed with the support in the form of the slurry followed by drying, or may be impregnated on silica or other support. The catalyst may be prepared in any convenient form as, for instance, small particles suitable for use in the fluidized bed reactor. For the purpose of this invention, a catalyst having a particle-size between 1 and 500 microns is preferred.

In general, any apparatus of the type suitable for carrying out reactions involving contacting vapors with a suspended powdered solid may be used in the present process. The process may be carried out either continuously or intermittently. The only requirement for the reactor used in the present invention is that it be made up of at least two compartments which are separated one from the other by at least one foraminous member. More preferred is the process carried out in a reactor having at least four compartments, each separated from the next adjacent one by a foraminous member. The preferred apparatus comprises a column containing a plurality of foraminous members or perforated trays stacked horizontally through the length of the column. The perforations in the trays, gas velocities and particle-size of the catalyst are sufficiently controlled to give a self-regulating type of operation whereby the catalyst is uniformly distributed throughout the length of the reactor vessel.

The process of the present invention produces unexpectedly superior results in comparison with the results obtained under the same conditions in a conventional single compartment fluidized catalyst apparatus.

The reactor is preferably a round, flat or cone bottom tube constructed of metal, such as stainless steel, or other suitable material. Near to and up from the bottom of the tube there may be a transversely mounted reactant gas distribution grid or a distribution "spider" as is well-known in the art. This may serve both as a catalyst support and as a sparging grid for air or oxygen which is introduced below the grid. More details concerning the sparger grid may be found in U.S. Patents Nos. 2,893,849, 2,893,851 and 2,975,037.

The foraminous members which separate one compartment from another in the reactor are generally mounted transversely within the reactor and may be one or more of the types and arranged in one or more of the fashions more fully disclosed in U.S. Patents Nos. 2,433,798, 2,730,556, 2,740,698, 2,823,219, 2,847,360, 2,893,849 and 2,893,851, as well as in the article appearing in the A. I. Ch. E. Journal, vol. 5, No. 1, pages 54–60 (March 1959).

The types of openings in the foraminous members may be widely varied, the only requirement being that at least some of the openings be large enough to allow the passage of the catalyst and reactants through them. More details concerning the numerous types and arrangements of openings in the foraminous members or plates defining the reactor compartments will be found in U.S. Patents Nos. 2,433,798, 2,740,698, 2,893,849, 2,893,851, and the aforementioned article appearing in the A. I. Ch. E. Journal. It is preferred that the openings in the foraminous members be rectangular, circular, or oval in shape and that the size of the openings fall within the limits of from 0.025 to 3 inches in diameter.

The amount of open area in the foraminous members may vary so long as it is within the limits of from 7.5 to 50% of the total internal cross-sectional area of the reactor. For more details concerning the open area in the foraminous members see U.S. Patents Nos. 2,433,798, 2,893,849 and 2,893,851.

As has been pointed out earlier and will be seen in the examples which follow, the spacing of the foraminous members in the reactor is not a critical feature in the present process. Stated differently, it is not essential that all of the reaction compartments be of the same volume in the present process. Many types of spacing and arrangement of the foraminous members may be used and more details concerning the variations in spacing will be found in U.S. Patents Nos. 2,471,085, 2,823,219, 2,893,849, and 2,989,544. The use of rotatable foraminous members, such as that disclosed in U.S. Patent No. 2,893,851, is within the scope of the process of the instant invention, but is not a preferred embodiment. In any event, it is preferred that the distance between any two foraminous members be no greater than about twice the inside diameter of the reactor. Stated differently, it is preferred for a given reaction compartment that the height be no greater than about two diameters of the internal cross-section of the compartment.

It is often desirable, and actually is preferred, to include cooling and heating coils within the reaction compartments for better temperature control during the reaction. Such an arrangement is typified in U.S. Patent No. 2,893,851.

Because the catalyst fines often tend to be elutriated to some extent from the top of the reactor during the course of the reaction, it is convenient to expand the upper section of the reactor so that it acts as a disengaging section and it is often desirable to include at the top of the reactor means for recovering most or all of the catalyst fines, as disclosed in U.S. Patents Nos. 2,494,614, 2,730,556 and 2,893,851. After the aforementioned catalyst recovery it is also convenient to recycle the recovered catalyst fines through the reaction compartments by reintroducing them at a point near the bottom of the reactor, as disclosed in U.S. Patents Nos. 2,494,614 and 2,847,360 and in the aforementioned article appearing in the A. I. Ch. E. Journal. The catalyst fines may be recovered and recycled, for instance, by employing a cyclone at the upper section of the reactor and a dip-leg for reintroducing the recovered catalyst into the bottom or near the bottom of the reactor.

The reactor may be brought to the reaction temperature before or after the introduction of the reaction feed mixture. In a large-scale operation it is preferred to carry out the process in a continuous manner, and in such a system, the recirculation of the unreacted olefin is contemplated. Periodic regeneration or reactivation of the catalyst is also contemplated, and this generally may be accomplished, for instance, by contacting the catalyst with air at an elevated temperature.

The reactor is, in essence, a sequence of several fluid beds with very limited back-flow of vapor. Catalyst circulation throughout the reactor compartment is slow but preferably not entirely eliminated. Each reaction compartment is a nearly perfectly stirred reactor in which the gases being contacted experience a very short average contact time. Because this contact time is short, contact time distribution is also very sharp. The effect of multiplying this short, sharp contact time over several reaction compartments in the instant novel process is to produce an overall contact time distribution which is much sharper than that which could be achieved in a single conventional fluid bed.

In accordance with the present invention, the gaseous reactants may all be introduced into the reactor at one place, they may be introduced separately or in various combinations, provided that they are eventually mixed and contacted with the fluidized catalyst in a plurality of reaction compartments.

Some of the catalysts embodied in this invention, the antimony oxide-containing catalysts in particular, are highly selective and active primarily when they are maintained in their highest oxidation state. When all the reactants are introduced together or at closely spaced positions in the reactor, a gradual decrease in selectivity, i.e., preferential formation of diolefin from olefin, and ultimately a decrease in conversion of olefin will occur. If periodic air (or oxygen) regenerations of the catalyst in a separate zone are employed before this decrease in selectivity and activity is allowed to occur to an appreciable extent, the initial selectivity and activity level of the catalyst can be restored each time when the regenerated catalyst is transferred back to the reaction zone. By feeding the oxygen into the bottom of a multi-compartment sieve-tray reactor, and introducing the hydrocarbon feed at a point at least and preferably several sieve trays higher or upstream in the reactor, the catalyst in the bottom of or downstream in the reactor is continuously exposed to an oxidizing atmosphere, thus a high oxidation level, selectivity and activity are maintained without the necessity for periodic regeneration of the catalyst. The catalyst in the bottom "regeneration" section is in constant movement. "Fresh" catalyst moves up into the reaction zone and "used" catalyst moves down into the regeneration section by the natural flow pattern of the sieve tray reactor (and on a commercial scale by the cyclone dip-legs which dump catalyst and fines collected at the top of the reactor back into the regeneration zone) thus effecting continuous auto-regeneration of the catalyst. The sieve trays between the two feed inlets prevent or minimize excessive back mixing of the hydrocarbon feed into the regeneration zone. The foregoing procedure is preferred in this invention for regenerating catalyst.

The effluent from the reaction zone can be quenched, but normally this is not required, inasmuch as there is little tendency for side reactions to take place, particularly at the preferred temperature range. The effluent can then be washed with dilute caustic to remove any acids present and to remove the steam. If air is used as a source of oxygen, the effluent is then compressed and scrubbed with oil to separate the hydrocarbons from the nitrogen, carbon dioxide and carbon monoxide. The hydrocarbons may then be stripped from the oil and subjected to an extractive distillation or a copper ammonium acetate treatment to separate and recover the diolefin. Unreacted monoolefin can be recycled to the reactor.

In the examples, conventional auxiliary equipment, including meters, were employed for carrying out the reaction, and all the data reported herein is within the usual limits of experimental accuracy for such equipment. The particular reactor employed was a 36 inch length of stainless steel pipe having an inside diameter of 3 inches and enclosed at the bottom. Near the bottom of the flat bottom reactor was a porous steel plate which served both as a catalyst support and as a sparging plate for air which was introduced into the reactor just below the sparging plate and below the point at which the olefin was introduced. The trays forming the compartments in the reactor were removable and were hung from a central ¼ inch thermocouple well. The plates were spaced at any desired interval with ⅜ inch sleeves which slipped over the central thermocouple well. A nut at the bottom of the well held the whole assembly intact. The trays were cut circularly to fit with a minimum clearance on the inside of the reactor. In operation, the entire reactor assembly was immersed in a temperature-controlled molten salt bath. A catalyst bed-depth of 18 inches was employed in the examples.

In the specification and the following examples the following definition was employed:

$$\text{percent conversion} = \frac{\text{moles of diolefin recovered}}{\text{moles of olefin fed}} \times 100$$

Example I

A bismuth phosphomolybdate catalyst was prepared as follows:

A solution containing 9.3 cc. of 85% phosphoric acid, 272 g. of molybdic acid (85% $MoO_3$), 40 cc. of nitric acid, and 582 g. of $Bi(NO_3)_3 \cdot 5H_2O$ in 400 cc. of water was added to 750 g. of an aqueous colloidal silica containing 30% silica. The mixture was then evaporated to dryness and heated at 1000° F. for 16 hours. Subsequently, it was ground and screened to 40–100 mesh.

The foraminous members or trays used in this experiment were sheet metal trays having ³⁄₁₆ inch in diameter holes with 20% open area. Six trays were used and they were spaced three inches apart in the reactor.

Constant temperature, i.e., a temperature of 850° F., a pressure of near atmospheric, and a mole ratio of 1 butene-1 to 8 air to 4 water were employed in the reaction. A constant contact time of 6 seconds was used throughout. The results of two runs, one in the reactor having no trays (single compartment) and one in the 6 tray reactor described above are tabulated below.

| | Percent per pass conversion to butadiene-1,3 |
|---|---|
| No tray reactor (control) | 43.7 |
| 6 tray reactor | 54.9 |

Small amounts of by-products from each reaction were made up of CO, $CO_2$ and less than 1% of furan, methyl vinyl ketone, acetaldehyde and acrolein.

Example II

A catalyst system composed of antimony oxides and uranium oxides with an Sb:U atomic ratio of 6:1 was prepared in accordance with the following procedure:

45 g. of 150 mesh antimony metal was dissolved in 186 cc. of nitric acid (specific gravity 1.42) by boiling until the evolution of the oxides of nitrogen had ceased. To this reaction mixture was then added 26.7 g. of uranyl acetate dissolved in 200 cc. of water; 150 cc. of 28% ammonium hydroxide was added to the mixture, and the reaction slurry was filtered and washed with three 100 cc. portions of wash water containing a small amount of ammonium hydroxide. The catalyst was then dried at 120° C. in an oven overnight, calcined at 800° F. overnight, and activated by heating at 1800° F. for twelve hours in a muffle furnace open to the atmosphere. 60.6 g. of this activated catalyst was added with stirring and heating to 198 g. of an aqueous silica sol containing 30 wt. percent $SiO_2$. The catalyst was then dried in the oven at 130° C. with occasional stirring for three hours, and calcined at 800° F. overnight, and activated by heating at 1800° F. for 12 hours in a muffle furnace open to the atmosphere.

The procedure and apparatus more fully described in Example I were employed with the exception that the foregoing antimony-uranium oxide catalyst was used. The reaction was carried out in a 12 tray reactor employing butene-1, air and water in the mole ratio of 1:10:4 respectively, a reaction temperature of 800° F. and a contact time of 6 seconds with the following results:

| | Percent per pass conversion to butadiene-1,3 |
|---|---|
| No tray reactor (control) | 45.7 |
| 12 tray reactor | 60.5 |

Similar results were obtained when isoamylene and pentene-1 were substituted for the butene-1 in the foregoing reactions to produce isoprene and piperylene, respectively.

Example III

A catalyst composed of the oxides of antimony and iron was prepared as follows: 45 grams of antimony metal which was fine enough to pass through an 80 mesh screen were completely oxidized in 180 m's. of hot, concentrated nitric acid of 1.42 specific gravity, 17.2 grams of $Fe(NO_3)_3 \cdot 9H_2O$ were added and the mixture was evaporated nearly to dryness. Then 43 grams of a 30% aqueous silica sol and enough distilled water for rinsing were added. 28% $NH_4OH$ was then added to obtain a pH of 8.0. The resulting precipitate was isolated by filtration and the filtrate was washed with 600 mls. of distilled water in three portions. The material was dried at 120° C. for 15 hours, calcined at 800° F. for 24 hours, and heat treated at 1400° F. for 8 hours.

The material was then ground so that it passed through a 170 mesh screen and then was mixed vigorously with 43 grams of a 30% aqueous silica sol. This paste was then extruded using a cake decorator. The extrudate was air dried for four hours and then at 120° C. for 15 hours. Finally, the extrudate was heat treated at 1400° F. for 48 hours and was ground and screened to pass through an 80 mesh screen and be retained on a 230 mesh screen.

Results similar to those obtained in the previous examples were obtained with the foregoing antimony oxide-iron oxide catalyst in the oxidative dehydrogenation of butene-1 to butadiene in an apparatus similar to that described in Example I.

*Example IV*

The oxidative dehydrogenation of a hydrocarbon feed consisting of 40% by weight of butene-1 and 60% by weight of butene-2 (11% cis and 89% trans) was carried out in a fluidized reactor similar to that described in Example I. The reactor contained eleven symmetrically spaced trays, each tray containing ⅛ inch diameter holes and 28% open space. A feed ratio of air to hydrocarbon of 10, a reaction temperature of 850° C. and a 4 second contact time were used. The air was introduced into the bottom of the reactor at a point below the first tray and the hydrocarbon feed was introduced at a point below the third tray from the bottom. This configuration resulted in an autoregeneration zone for the catalyst in the bottom two or three compartments. In life test studies, this reaction was run without interruption for more than 444 hours and a per pass conversion of mixed butenes to butadiene of about 48% was maintained all during this time and there was no indication that the catalyst had lost any activity of required regeneration.

When the foregoing reaction was repeated with the exception that the air and hydrocarbon feed were both introduced at the same point in the reactor, below the first tray, the same per pass conversions were obtained initially, but it was necessary to regenerate the catalyst periodically by contacting it with air or oxygen alone in order to restore its initially high activity.

A repeat of the foregoing procedures using an eleven tray reactor and a feed of butene-1 resulted in initial (and continuous in the case of the autoregenerative zone) per pass conversions of hydrocarbon to butadiene of 71%. Similarly a feed of trans butene-2 produced a per pass conversion of 42% and a feed of cis butene-2 gave a per pass conversion of 45.1%.

Results similar to those described above were obtained when the other antimony oxide-containing catalysts described herein were used in place of the antimony oxide-iron oxide catalyst described above.

We claim:

1. A process for preparing a diolefin comprising feeding oxygen into a zone near the bottom of an enclosed vertical reaction area having a plurality of communicating zones containing a fluidized solids catalyst in each zone, introducing into a communicating zone at least one above the zone into which the oxygen was introduced a monoolefin free of quaternary carbon atoms and containing from 4 to 8 carbon atoms, at least four of which are arranged in a series in a straight chain, maintaining an elevated temperature and a pressure of from 1 to 3 atmospheres throughout the reaction area, passing the reactant vapors upwards through the succesive zones containing the fluidized catalyst, maintaining a contact time of from 0.1 to 50 seconds and recovering the diolefin from the top of the reaction area.

2. The process of claim 1 wherein the molar ratio of oxygen to olefin is from about 0.3:1 to 3:1.

3. The process of claim 2 wherein the reactant mixture also contains water in the molar ratio of water to olefin of from 0.1:1 to 6:1.

4. The process of claim 3 wherein the number of zones is from 4 to 12.

5. A process for preparing a diolefin comprising introducing oxygen at a point into a zone near the bottom of a vertical enclosed reaction area having a plurality of communicating zones containing a fluidized solids catalyst selected from the group consisting of antimony oxide, the combined oxides of antimony and tin, the combined oxides of antimony and uranium, the combined oxides of antimony and iron, the combined oxides of antimony and cerium, and the combined oxides of antimony and manganese, in each zone, introducing into a communicating zone at least one above the zone into which the oxygen was first introduced a monoolefin free of quaternary carbon atoms and containing from 4 to 8 carbon atoms, at least four of which are arranged in a series in a straight chain, maintaining an elevated temperature and a pressure of from 1 to 3 atmospheres throughout the reaction area, passing the reactant vapors upward through the successive zones containing the fluidized catalyst, maintaining a contact time of from 0.1 to 50 seconds and recovering the diolefin from the top of the reaction area.

6. The process of claim 5 wherein the molar ratio of oxygen to olefin is from about 0.3:1 to 3:1.

7. The process of claim 6 wherein the total number of zones is from 4 to 12.

8. The process of claim 7 wherein the reaction temperature is from 325 to 1000° C.

9. The process of claim 8 wherein the olefin is butene-1.

10. The process of claim 8 wherein the olefin is isoamylene.

11. The process of claim 8 wherein the olefin is pentene-1.

References Cited

UNITED STATES PATENTS

| | | | |
|---|---|---|---|
| 2,809,981 | 10/1957 | Kittleson et al. | 260—683.3 X |
| 2,893,851 | 7/1959 | Georgian | 208—163 X |
| 2,944,009 | 7/1960 | Huntley et al. | 208—163 X |
| 2,991,320 | 4/1961 | Hearne et al. | 260—680 |

FOREIGN PATENTS 902,952   8/1962   Great Britain.

PAUL M. COUGHLAN, JR., *Primary Examiner.*